R. PEUGEOT.
ELECTRICAL GENERATOR WITH COUNTER COMPOUNDING.
APPLICATION FILED DEC. 12, 1913.
1,363,167. Patented Dec. 21, 1920.
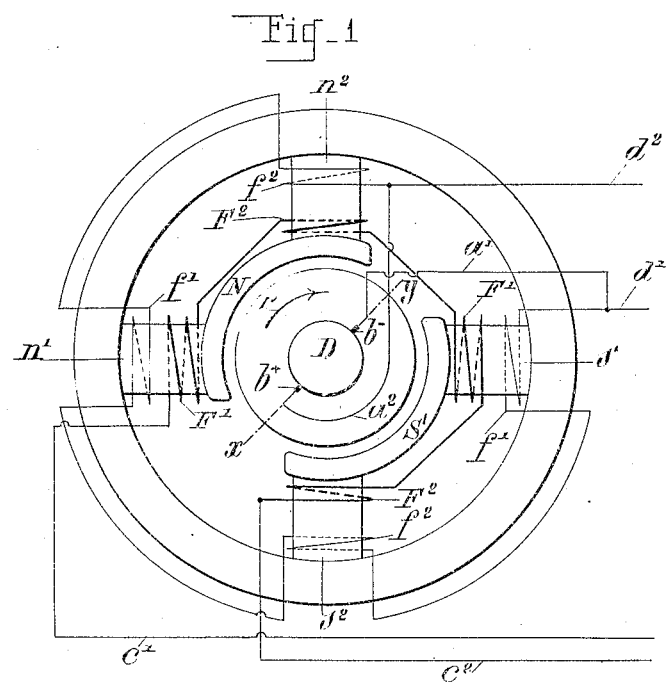
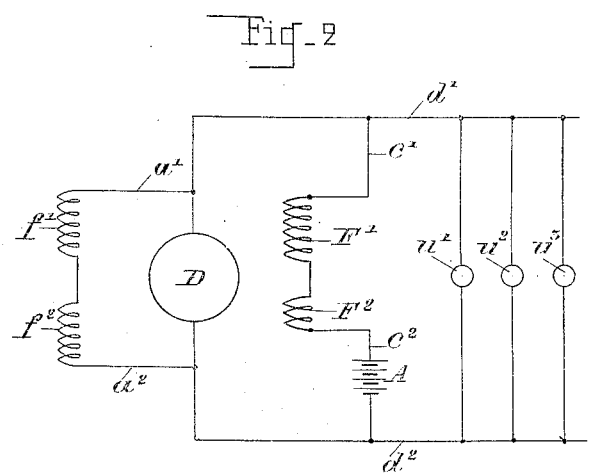
WITNESSES
John H. Hoving
Cornelius Hoving
INVENTOR
ROBERT PEUGEOT
By F. Van Oldenneel
ATTORNEY R. PEUGEOT.
ELECTRICAL GENERATOR WITH COUNTER COMPOUNDING.
APPLICATION FILED DEC. 12, 1913.

1,363,167.

Patented Dec. 21, 1920.
2 SHEETS—SHEET 2.

INVENTOR:
ROBERT PEUGEOT

BY *Lawrence Langner*
ATTORNEY

UNITED STATES PATENT OFFICE.

ROBERT PEUGEOT, OF VALENTIGNEY, FRANCE.

ELECTRICAL GENERATOR WITH COUNTER-COMPOUNDING.

1,363,167.   Specification of Letters Patent.   Patented Dec. 21, 1920.

Application filed December 12, 1913. Serial No. 806,229.

*To all whom it may concern:*

Be it known that I, ROBERT PEUGEOT, citizen of the Republic of France, residing at Valentigney, Doubs, France, have invented an Improved Electrical Generator with Counter-Compounding, of which the following is a specification, reference being had therein to the accompanying drawing.

The invention has for its object to provide an improved electrical generator with counter compounding, designed to work at constant voltage in conjunction with a battery of accumulators, and to be driven by a variable speed motor.

By the improved construction a compounding effect is obtained on starting the machine by reason of the increase in the total magnetic flux, and at high speeds a counter-compounding effect is produced by the combination of the diminution of the total magnetic flux, with the effect due to the simultaneous displacement of the neutral line in the direction of the rotation of the machine, this effect being then added to that of the armature reaction.

To facilitate the understanding of this invention reference is made by way of example to the accompanying drawings, in which:—

Figure 1 is a diagrammatic view showing the arrangement of the coils on the cores of the dynamo D in the case of a bi-polar machine.

Fig. 2 shows diagrammatically the general disposition of the improved generator relatively to the external circuit.

Similar references indicate the same elements in the three figures of the drawings.

Figure 3:
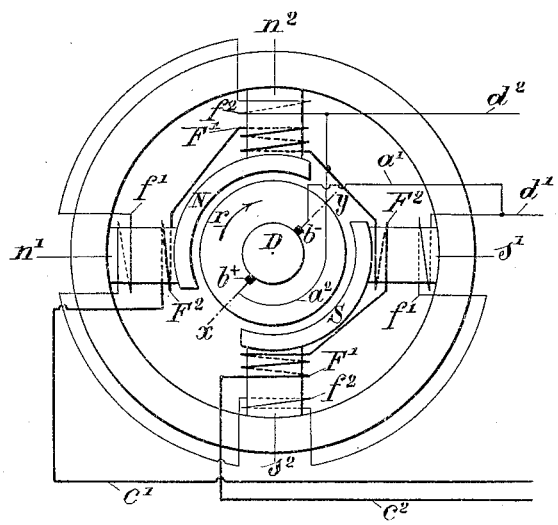
Fig. 3 is a diagrammatic view showing a modification of the arrangement of the coils on the cores of the dynamo D.

As shown in Fig. 1, each of the poles N and S of the machine is composed of two twin cores $n^1$ $n^2$ and $s^1$ $s^2$, each having a winding of thick wire $F^1$ $F^2$, and a winding of fine wire $f^1$ $f^2$. The relative number of turns of the coils $F^1$ and the coils $F^2$ is determined in a manner hereinafter described, it being assumed that the armature is rotating in the direction of the arrow $r$ (Fig. 1).

The thick wire windings $F^1$ $F^2$ are arranged in series in the charging circuit of the accumulators A as shown in Fig. 2 by means of suitable leads $c^1$ $c^2$, and are further wound in such a manner that their ampere turns are added to those of the fine wire coils $f^1$ $f^2$, when the accumulators are supplying current.

The fine wire coils $f^1$ $f^2$ are arranged and wound as shown in Fig. 1; they are connected by suitable leads $a^1$ $a^2$, to the brushes $b^+$ $b^-$ of the machine. The latter are also connected by means of leads $d^1$ $d^2$ to the circuit containing the apparatus $u^1$ $u^2$ $u^3$ which utilizes the current.

The number of the turns of the coarse windings $F^1$, arranged on the poles $n^1$ and $s^1$ is greater than the number of turns of the coarse windings $F^2$, arranged on the poles $n^2$ and $S^2$.

Under these conditions, it will be seen that on starting the dynamo and so long as the accumulator is not being charged that is to say while it is supplying current to the external load circuit, the ampere turns of the thick wire winding will be added to the ampere turns of the fine wire windings and thus produce a compounding of the machine due to the increase of the total magnetic flux. The neutral line of flux will at the same time move around from its normal position $x$—$y$ in the direction opposite to that of rotation of the armature, and the position of the brushes must then be correspondingly altered.

According as the speed of rotation of the dynamo increases, the current from the accumulator battery will diminish, and the compounding effect of the thick wire coils consequently diminish, and simultaneously the neutral line will move around in the direction of rotation of the armature.

When the accumulators commence to receive current the effect of the thick wire coils is opposed to that of the thin wire coils thereby diminishing the total magnetic flux, the ampere turns on each core being then determined by the difference between the fine wire ampere turns and the thick wire ampere turns. At the same time the neutral line continues to move around in the direction of rotation of the armature. The effect of this displacement is added to that of the armature reaction for producing the limitation of the voltage.

The special arrangement of the windings according to this invention allows of obtaining the following advantages:

The greater the rate of consumption of the current from the accumulator battery, the more rapidly the voltage will be attained, and consequently the more intense the current passing through the thick wire windings. This allows of the external circuit being closed at lower speeds of the machine and this the greater the charge of the accumulator battery.

The charging of the battery will be effected much more rapidly than with a machine comprising an ordinary differential winding and in series in the charging circuit of the accumulators.

When the machine is at rest, the thick wire coils $F^1$ $F^2$ prevent reversal of the poles of the dynamo.

The limitation of the charging current of the accumulator battery when only the latter is connected to the terminals of the dynamo, is completely assured because the thick wire coils $F^1$ $F^2$ then intervene so as to counter-compound the magnetizing effect of the current delivered by the dynamo.

The distribution of the ampere turns on cores of small dimensions allows of effecting a considerable saving in copper.

It should be noted that the combination of the displacement of the neutral line with the simultaneous counter compounding effect produced in an arrangement according to this invention allows of effecting a compensation which is much more efficient than that which would be produced by the simple addition or subtraction of the ampere turns of the thick wire and fine wire windings on the cores of the machine, and the limitation of the current when the machine is rotating at high speeds, is thus effected under very remarkable conditions.

In practice the best way of applying the improvements according to the present invention consists in distributing the thick wire coils $F^1$ $F^2$ in unequal amounts on the cores $n^1$ $n^2$ and $s^1$ $s^2$ constituting the poles N and S of the dynamo D.

In fact, this particular distribution allows of controlling the displacement of the neutral line, since it is then possible for a given total number of turns of the thick wire coils to produce on the cores $n^1$ $n^2$ and $s^1$ $s^2$ any distribution which may be desired for the purpose of producing more or less intense effects.

The displacement of the neutral line will be less the smaller the difference between the number of turns of the coils $F^1$ and of the coils $F^2$. Finally the neutral line would not undergo any displacement if the said windings were distributed equally respectively on the two cores $n^1$ $n^2$ and on the two cores $s^1$ $s^2$. The machine would then behave like an ordinary machine having poles consisting of a single core.

It is also possible to obtain compensating actions comparable to those above described, by arranging the coarse wire windings in such a manner that the rotation of the flux due to these windings shall have a reverse direction of rotation to that of the machine. The windings are then arranged as shown in Fig. 3 of the drawings.

By distributing the amounts of the coarse wire windings $F^1$ and $F^2$ upon the four cores $n^1$, $n^2$, $s^1$, $s^2$ in a proportion equal to the proportion used in the first construction of the electrical generator with counter compounding object of the present invention, (that is to say in such a manner that the number of the turns of the windings $F^1$ is greater than the number of the turns of the windings $F^2$), but by disposing the windings $F^1$ on the cores $n^2$ and $s^2$, respectively (and not on cores $n^1$ and $s^1$) and the windings $F^2$ on the cores $n^1$ and $s^1$, respectively (and not on cores $n^2$ and $s^2$) (see Fig. 3 of the drawings), the following result is obtained:

The rotation of the resultant field, due to the transverse flux adds its action to that of the coarse wire windings, so that the rotation of the field, according to this second construction will be more important than in the case of the first construction, in which the action of the transverse flux is deducted from that of the coarse windings above specified.

Consequently it may be supposed that this second mode of construction of the system in question will be proportionately less powerful than the first mode of construction above specified, since the rotation of the field is less for a determined intensity of current. However, it is to be noted that with the aforesaid second construction, it is possible to obtain an equally powerful action, as in the case of the first construction, relatively to the rotation of the field, by increasing for this purpose, the difference between the number of turns of the coarse wire winding on the cores of one and the same pole. In such a case, with an equal amount of coarse wire, and notwithstanding the opposing influence of the transverse flux, there will be obtained the same angular rotation of the field, but in this case the said portion will be in the reverse direction of the rotation of the machine.

This improved construction has thus the advantage of facilitating the commutation of the machine by reinforcing the magnetism at the leading pole horns, whereas in the construction above described, the reinforcement takes place at the trailing pole horns, which is unfavorable to the commutation.

Consequently by the improved construction according to the modifications in question there can be produced for the same weight of copper a machine which will be as well compensated as a machine constructed in accordance with the above specified construction, and which will have over the latter machine the further advantage of a better commutation.

It is to be noted by the way that the transverse flux plays a relatively small part in either case, owing to the fact that on the one hand the thickness of the pole pieces of such a machine is relatively very small compared to their length in the direction of the rotation of the armature, and on the other hand, these pole pieces are approaching magnetic saturation.

Therefore when the machine is running at its average speed, the magnetic circuit of the transverse flux will have a great reluctance, and consequently its influence will be small.

Solely the rotation of the field due to the modification of the magnetism of the cores will have a practical importance and may amount to as much as 50 degrees.

Having now particularly described and ascertained the nature of my said invention and in what manner the same is to be performed, I declare that what I claim is:

1. In an electric generator, the combination of an armature having a commutator; a plurality of pole pieces each comprising a pair of cores and a connecting shoe; a pair of brushes engaging the commutator; fine-wire field coils of equal number of convolutions connected in series with each other from brush to brush; line wires connected to the respective brushes; and thick wire field coils of unequal number of convolutions connected in series with each other and adapted to be connected across the line wires.

2. In an electric set, the combination of an armature having a commutator; a plurality of pole pieces each comprising a pair of cores and a connecting shoe; a pair of brushes bearing on said commutator; field coils of equal number of convolutions on each core and connected in series with each other from brush to brush; an accumulator; thick-winding coils on each of said cores some having a different number of convolutions from others; line wires connected to the brushes and conductors connecting said thick-winding coils and the accumulator in series with each other and across the line wires.

In testimony whereof I have affixed my signature in presence of two witnesses.

ROBERT PEUGEOT.

Witnesses:
    JULES FAYOLLET,
    ANDRÉ BORDILLO.